Patented Oct. 30, 1945

2,388,161

UNITED STATES PATENT OFFICE 2,388,161

TETRA-ALLYL SILICANE AND PROCESS OF PREPARING THE SAME

Edward L. Kropa, Old Greenwich, Conn., assignor to American Cyanamid Company, New York, N. Y., a corporation of Maine No Drawing. Application July 31, 1944, Serial No. 547,525

3 Claims. (Cl. 260—607)

This invention relates to tetra-allyl silicane and to a process of preparing same.

Tetra-allyl silicane may be prepared by reacting magnesium, allyl chloride or allyl bromide, and silicon tetrachloride in the presence of anhydrous ethyl ether in accordance with the Barbier modification of the Grignard reaction. This is illustrated in the following examples in which the proportions are in parts by weight.

Example 1

| | Parts |
|---|---|
| Magnesium turnings | 120 |
| Allyl chloride | 383 |
| Silicon tetrachloride | 85 |
| Anhydrous ether | 371 |

The magnesium is "baked out" and the diethyl ether is mixed therewith in a suitable reaction vessel provided with an agitator and a reflux condenser and a distillation condenser (or with a single condenser adjustable for both purposes) containing a drying tube. About 20 parts of the allyl chloride is added to the mixture and the mixture is heated by any suitable means such as by means of a steam jacket surrounding the reaction vessel. The reaction may be initiated if it does not start immediately by the introduction of a small amount of allyl magnesium chloride. The remainder of the allyl chloride is added to the reaction vessel slowly over a period of about 4 hours during which time the reaction proceeds vigorously. 176 parts by weight of dry benzene was added during the reaction to facilitate agitation. The reacting mixture, which is rather pasty, is heated under reflux with agitation for 2 additional hours after which an additional portion of 176 parts of benzene is added. The reaction mixture is then distilled until the temperature of the distillate reaches 65° C. after which the mixture is heated for a further period of about 4 hours under reflux. The reaction mixture is now cooled. About 350 parts of benzene is added to the mixture and then the resulting mixture is poured slowly over about 1000 parts of ice. The unreacted magnesium (about 30 parts) is removed and may be used in another batch. The benzene layer is separated from the reaction mixture and the benzene is removed by distillation after the residue is distilled in vacuo. About 89.6 parts (95% based on silicon tetrachloride) of tetra-allyl silicane is obtained. The product has a boiling point of 102–103° C. at 15 mm.; $n^{20°} = 1.4864; d_4^{20°} = 0.8353$.

Example II

| | Parts |
|---|---|
| Magnesium turnings (12 mols) | 288 |
| Allyl chloride (12 mols) | 917 |
| Silicon tetrachloride (1.5 mols) | 255 |
| Anhydrous ether | 923 |

Example 1 is repeated but larger proportions of materials are employed. In this case a yield of about 260 parts of tetra-allyl silicane (about 90%) is obtained.

I have found that it is desirable to employ a relatively large excess of allyl chloride or allyl bromide and magnesium in order to obtain a high yield. However, the proportions may be varied from equimolecular proportions of the allyl halide, magnesium and silicon tetrachloride up to 15 mols of the allyl halide, 15 mols of magnesium to 1 mol silicon of tetrachloride. Preferably the ratio of the allyl halide to silicon tetrachloride is at least 5:1.

Tetra-allyl silicane may be polymerized by heating to temperatures about 50° C. up to about 200° C., or higher if desired, preferably in the presence of a polymerization catalyst including the organic superoxides, aldehydic and acidic peroxides. Among the preferred catalysts there are: the acidic peroxides e. g., phthalic peroxide, succinic peroxide and benzoyl acetic peroxide; fatty oil acid peroxides e. g., coconut oil acid peroxides, lauric peroxide, stearic peroxide and oleic peroxide; alcohol peroxides e. g. tertiary butyl hydroperoxide usually called tertiary butyl peroxide and terpene oxides e. g., ascaridole. In some instances other types of polymerization catalysts might be used such as soluble cobalt salts (particularly the linoleate and naphthenate) p-toluene sulfonic acid, aluminum chloride, stannic chloride and boron trifluoride, although any of the organic peroxides, such as those mentioned above, for example, are preferred.

A clear hard cast is obtained from tetra-allyl silicane containing about 1% of benzoyl peroxide by heating it to about 100° C. for about 8 days.

Tetra-allyl silicane may be polymerized in organic solvents such as toluene. After about 3 days at about 100° C. the polymer may be precipitated by the addition of methanol.

Tetra-allyl silicane may be copolymerized with unsaturated alkyd resins as described in my copending application Serial No. 541,042 filed June 13, 1944, of which the present application is a continuation-in-part.

Tetra-allyl silicane may be copolymerized with vinyl compounds such as styrene, vinyl acetate, the allyl esters (e. g., diallyl phthalate, diallyl fumarate, diallyl maleate, diallyl sebacate, diallyl adipate), substituted styrenes such as p-methyl styrene, any of the dichlorostyrenes, any of the dimethyl styrenes, any of the esters of acrylic or methacrylic acids (e. g., methyl methacrylate, ethyl methacrylate, methyl acrylate, ethyl acrylate, butyl acrylate, etc.) acrylonitrile, methacrylonitrile, acrolein, methacrolein, etc. Other unsaturated substances which may be copolymerized with the tetra-allyl silicane are the polyesters of the $\alpha,\beta$ unsaturated dicarboxylic acids e. g., dimethyl maleate, diethyl fumarate, dibutyl fumarate, diethyl itaconate, etc.

Polymers of tetra-allyl silicane or copolymers thereof are useful in coating compositions, castings, moldings, as adhesives, and in laminating. Various organic or inorganic fillers may be included in molding compositions such as alpha cellulose pulp, wood fiber, asbestos, glass and mica, whereas in laminating the polymers may be employed to bind together fabrics or paper composed of cellulosic fibers, asbestos, glass, polyamides (such as "Nylon") etc.

Since the polymers and copolymers of tetra-allyl silicane adhere to glass very tenaciously they are particularly useful where it is desire to obtain good adhesion to glass.

Obviously many modifications and variations may be made in the process and products described herein without departing from the scope of the invention as described in the appended claims.

I claim:
1. Tetra-allyl silicane.
2. A process of preparing tetra-allyl silicane which comprises heating a substance selected from the group consisting of allyl bromide and allyl chloride, magnesium and silicon tetrachloride in the presence of anhydrous ethyl ether wherein the molal ratio of the allyl chloride to the silicon tetrachloride is at least 1:1.
3. A process of preparing tetra-allyl silicane which comprises heating a substance selected from the group consisting of allyl bromide and allyl chloride, magnesium and silicon tetra chloride in the presence of anhydrous ethyl ether wherein the molal ratio of the allyl chloride to the silicon tetrachloride is between 5:1 and 15:1.

EDWARD L. KROPA.

Disclaimer 2,388,161.—*Edward L. Kropa*, Old Greenwich, Conn. TETRA-ALLYL SILICANE AND PROCESS OF PREPARING THE SAME. Patent dated Oct. 30, 1945. Disclaimer filed June 9, 1949, by the assignee, *American Cyanamid Company*.
Hereby enters this disclaimer to claim 2 of said Letters Patent.
[*Official Gazette July 12, 1949.*]

fumarate, diallyl maleate, diallyl sebacate, diallyl adipate), substituted styrenes such as p-methyl styrene, any of the dichlorostyrenes, any of the dimethyl styrenes, any of the esters of acrylic or methacrylic acids (e. g., methyl methacrylate, ethyl methacrylate, methyl acrylate, ethyl acrylate, butyl acrylate, etc.) acrylonitrile, methacrylonitrile, acrolein, methacrolein, etc. Other unsaturated substances which may be copolymerized with the tetra-allyl silicane are the polyesters of the $\alpha,\beta$ unsaturated dicarboxylic acids e. g., dimethyl maleate, diethyl fumarate, dibutyl fumarate, diethyl itaconate, etc.

Polymers of tetra-allyl silicane or copolymers thereof are useful in coating compositions, castings, moldings, as adhesives, and in laminating. Various organic or inorganic fillers may be included in molding compositions such as alpha cellulose pulp, wood fiber, asbestos, glass and mica, whereas in laminating the polymers may be employed to bind together fabrics or paper composed of cellulosic fibers, asbestos, glass, polyamides (such as "Nylon") etc.

Since the polymers and copolymers of tetra-allyl silicane adhere to glass very tenaciously they are particularly useful where it is desired to obtain good adhesion to glass.

Obviously many modifications and variations may be made in the process and products described herein without departing from the scope of the invention as described in the appended claims.

I claim:
1. Tetra-allyl silicane.
2. A process of preparing tetra-allyl silicane which comprises heating a substance selected from the group consisting of allyl bromide and allyl chloride, magnesium and silicon tetrachloride in the presence of anhydrous ethyl ether wherein the molal ratio of the allyl chloride to the silicon tetrachloride is at least 1:1.
3. A process of preparing tetra-allyl silicane which comprises heating a substance selected from the group consisting of allyl bromide and allyl chloride, magnesium and silicon tetra chloride in the presence of anhydrous ethyl ether wherein the molal ratio of the allyl chloride to the silicon tetrachloride is between 5:1 and 15:1.

EDWARD L. KROPA.

Disclaimer 2,388,161.—*Edward L. Kropa*, Old Greenwich, Conn. TETRA-ALLYL SILICANE AND PROCESS OF PREPARING THE SAME. Patent dated Oct. 30, 1945. Disclaimer filed June 9, 1949, by the assignee, *American Cyanamid Company*.
Hereby enters this disclaimer to claim 2 of said Letters Patent.
[*Official Gazette July 12, 1949.*]